United States Patent
Lin

(10) Patent No.: US 8,943,237 B1
(45) Date of Patent: Jan. 27, 2015

(54) PERFORMANCE IMPROVEMENT FOR ATTACHED MULTI-STORAGE DEVICES

(71) Applicant: Western Digital Technologies, Inc., Irvine, CA (US)

(72) Inventor: James S. Lin, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/925,746

(22) Filed: Jun. 24, 2013

Related U.S. Application Data

(60) Provisional application No. 61/829,055, filed on May 30, 2013.

(51) Int. Cl.
*G06F 3/00* (2006.01)
*G06F 13/12* (2006.01)
*G06F 13/38* (2006.01)
*G06F 13/10* (2006.01)

(52) U.S. Cl.
CPC ............ *G06F 13/102* (2013.01); *G06F 13/385* (2013.01)
USPC .......................... 710/20; 710/8; 710/63; 710/7

(58) Field of Classification Search
CPC ......... G11B 20/10; G06F 11/20; G06F 11/00; G06F 13/36
USPC ........................................................ 710/8, 63
See application file for complete search history.

(56) References Cited

U.S. PATENT DOCUMENTS

| | | | |
|---|---|---|---|
| 5,455,934 A * | 10/1995 | Holland et al. | 711/4 |
| 8,041,872 B1 | 10/2011 | Castleberry | |
| 2001/0012442 A1* | 8/2001 | Kodama | 386/98 |
| 2006/0047908 A1* | 3/2006 | Chikusa et al. | 711/114 |
| 2009/0067303 A1* | 3/2009 | Poo et al. | 369/47.34 |
| 2011/0219163 A1* | 9/2011 | Beadnell et al. | 710/315 |
| 2013/0073895 A1* | 3/2013 | Cohen | 714/6.2 |

* cited by examiner

*Primary Examiner* — Farley Abad

(57) ABSTRACT

A data storage device may comprise a controller, first and second host-addressable logical units and a communication interface. The first logical unit may comprise a first data storage, first endpoints associated with the first data storage and a first bus interface coupled between the first data storage and the first endpoints. The second logical unit may comprise a second data storage and second endpoints. The second endpoints may be associated with the second data storage and may be separate and distinct from the first endpoints. A second bus interface may be coupled between the second data storage and the second endpoints. The communication interface may be coupled to the first and second host-addressable logical units and may be configured according to communicate with the host according to a predetermined communication protocol.

24 Claims, 4 Drawing Sheets

PERFORMANCE IMPROVEMENT FOR ATTACHED MULTI-STORAGE DEVICES

CROSS-REFERENCE TO RELATED APPLICATIONS

This application claims priority to provisional U.S. Patent Application Ser. No. 61/829,055, filed on May 30, 2013, which is hereby incorporated by reference in its entirety.

BACKGROUND

The Universal Serial Bus Attached SCSI (UAS) protocol transfers commands and data from external disk drives with a Universal Serial Bus (USB) interface. UAS improves upon the existing Bulk-Only Transport (BOT) protocol to allow the host (e.g., a personal computer) to queue multiple commands on the device. However, UAS requires the storage device to transfer all the data for a command before transferring data for any other command. Indeed, in a device with multiple hard disk drives (HDDs), it is possible for two or more HDDs to be ready to transfer data, but a UAS device would only service one HDD's data transfer while making the other HDDs wait until the first one was finished.

DETAILED DESCRIPTION

Figure 1:
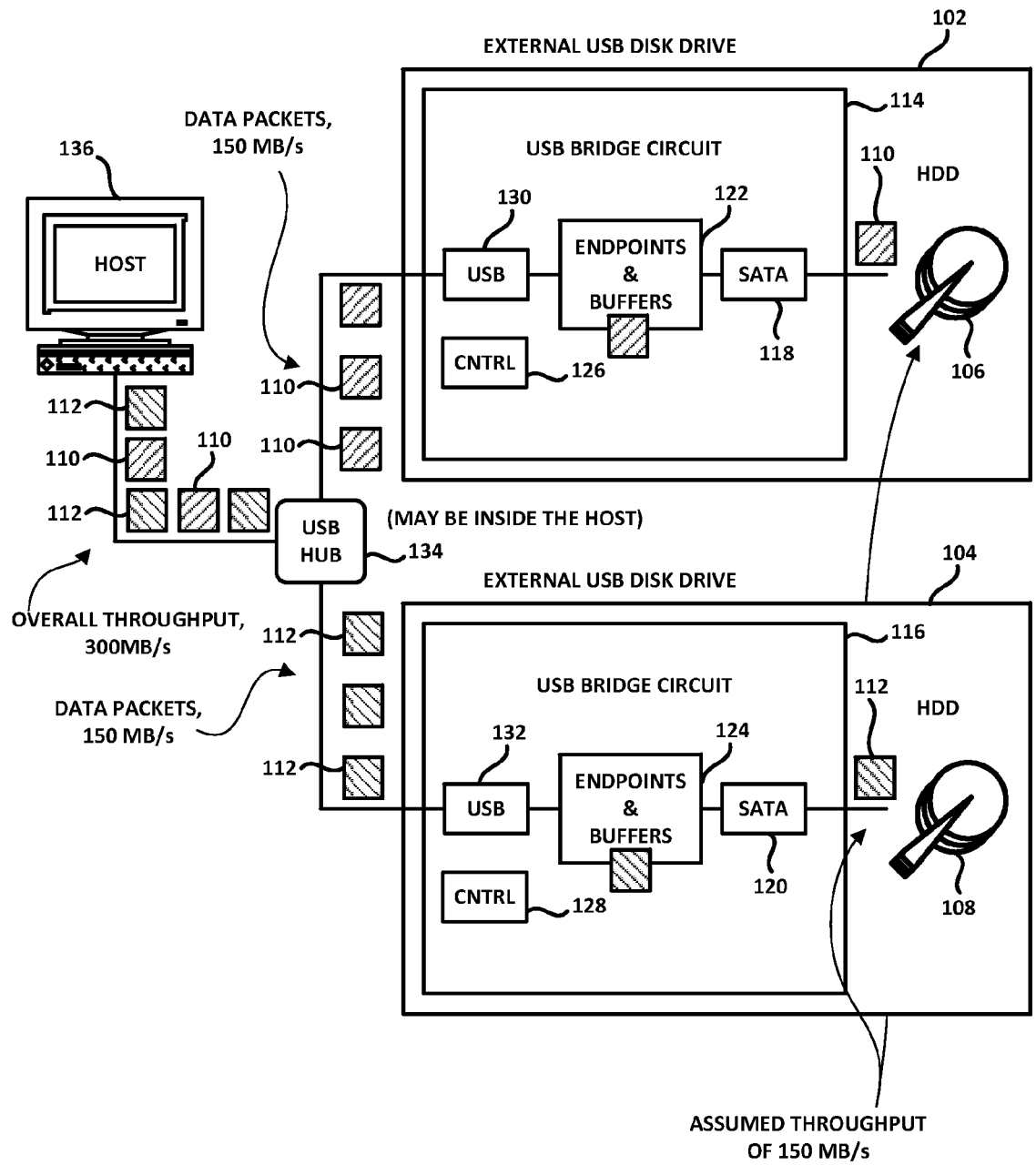
FIG. 1 is a block diagram showing two USB disk drives.

FIG. 1 is a block diagram showing a first external USB disk drive 102 and a second external USB disk drive 104. The first external USB disk drive 102 comprises a disk drive 106 and a USB bridge circuit 114. The USB bridge circuit 114 comprises a controller 126, a Serial ATA (SATA) interface 118 coupled to the disk drive 106 and a USB interface 130 that is connectable to a host 136. Endpoints and buffers 122 are coupled between the SATA interface 118 and the USB interface 130. The USB bridge circuit 114 is configured to process data access commands issued by host 136 and to write data packets 110 to and to read data packets 110 from the disk drive 106. Such data packets 110 may be transferred to the host as a result of the USB bridge circuit 114 processing one or more read commands issued by the host 136. A USB hub 134 is coupled between the USB interface 130 of the USB bridge circuit 114 and the host 136. Although shown in FIG. 1 as being external thereto, the USB hub 134 may be internal to the host 136. For example, the disk drive 106 may transfer to the USB bridge circuit 114 at a throughput of about 150 MB/sec. The data packets 110 may be provided at the USB interface 130 at 150 MB/sec to the USB hub 134.

Similarly, the second external USB disk drive 104 comprises a disk drive 108 and a USB bridge circuit 116. The USB bridge circuit 116 comprises a controller 128, a SATA interface 120 coupled to the disk drive 108 and a USB interface 132 that is connectable to a host 136. Endpoints and buffers 124 are coupled between the SATA interface 120 and the USB interface 132. The USB bridge circuit 116 is configured to process data access commands issued by host 136 and to write data packets 112 to and to read data packets 112 from the disk drive 108. Such data packets 112 may be transferred to the host via the hub 134 as a result of the USB bridge circuit 116 processing one or more read commands. The disk drive 108 may also transfer data packets 112 to the USB bridge circuit 116 at a throughput of about 150 MB/sec. The data packets 112 may be provided at the USB interface 132 at 150 MB/sec to the USB hub 134.

The hub 134 may be configured to interleave the data packets 110 from external USB disk drive 102 with the data packets 112 from external USB disk drive 104 and provide the interleaved stream of data packets 110, 112 to the host 136 at a throughput that is about equal to the sum of the throughputs of the external disk drives 102, 104. This allows both external disk drives 102, 106 to transfer data to the host 136 at the same time. As shown in FIG. 1, the throughput of the first external USB disk drive may be about 150 MB/sec and the throughput of the second USB disk drive may also be about 150 MB/sec, which is about the throughput of each of the disk drives 106, 108. The USB 3.0 (SuperSpeed) standard, however, allows for about 400 MB/sec throughput. Therefore, a combined throughput of 300 MB/sec from both first and second external USB disk drives may be readily accommodated by the USB 30.0 connection between the disk drives 102, 104 and the host 136.

Figure 2A:
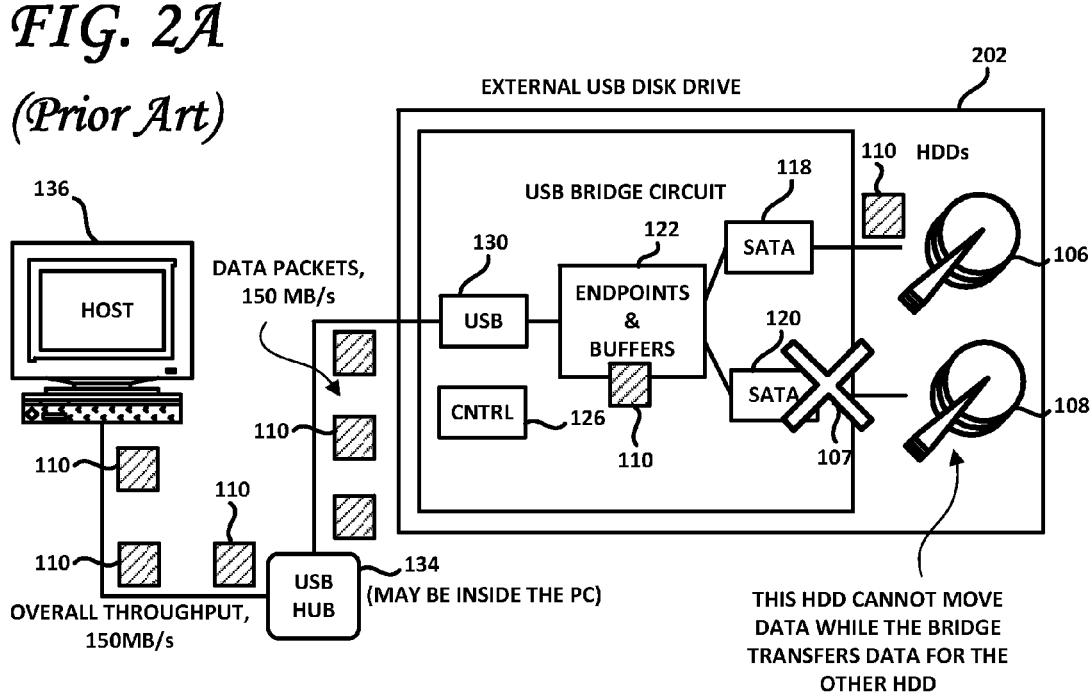
FIGS. 2A and 2B are block diagrams of different views of a data storage device comprising two USB HDDs.
Figure 2B:
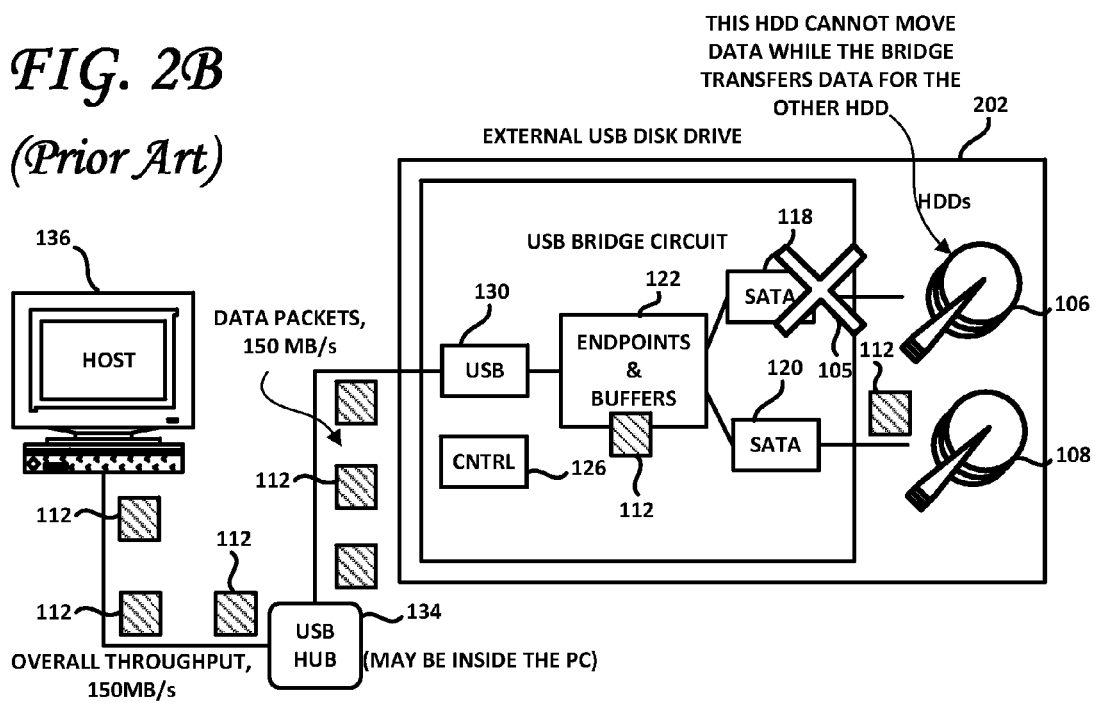

Conventionally, a SuperSpeed USB disk drive containing two or more disk drives, however, can only transfer data to and from one disk drive at a time. This constraint is due to the design of the UAS protocol. UAS allows the host 36 (e.g., a PC) to send multiple commands to all the disk drives in the USB drive, but the UAS protocol only allows transfer of data for one of those commands at a time. Therefore, it is likely that one of the disk drives will be waiting (i.e., not transferring data) until the other disk drive has finished transferring its data. Since a disk drive's sustained transfer rate (about 150 MB/s) is much less than the effective throughput of SuperSpeed USB (about 400 MB/s), the performance of a SuperSpeed USB drive with two disk drives may be effectively less than the performance of two individual drives. This situation is depicted in FIGS. 2A and 2B, each of which shows a USB disk drive having two disk drives 106 and 108. As shown, one of the HDDs of the UAS drive cannot move data while the bridge circuit transfers data for the other HDD of the UAS drive. Indeed, while disk drive 106 is transferring data in FIG. 2A, disk drive 108 is prevented from moving data, as suggested at 107. Similarly, while disk drive 108 is transferring data in FIG. 2B, disk drive 106 is prevented from doing so, as suggested at 105, due to limitations of the UAS protocol that only enables the transfer of data from one command at a time.

Figure 3:
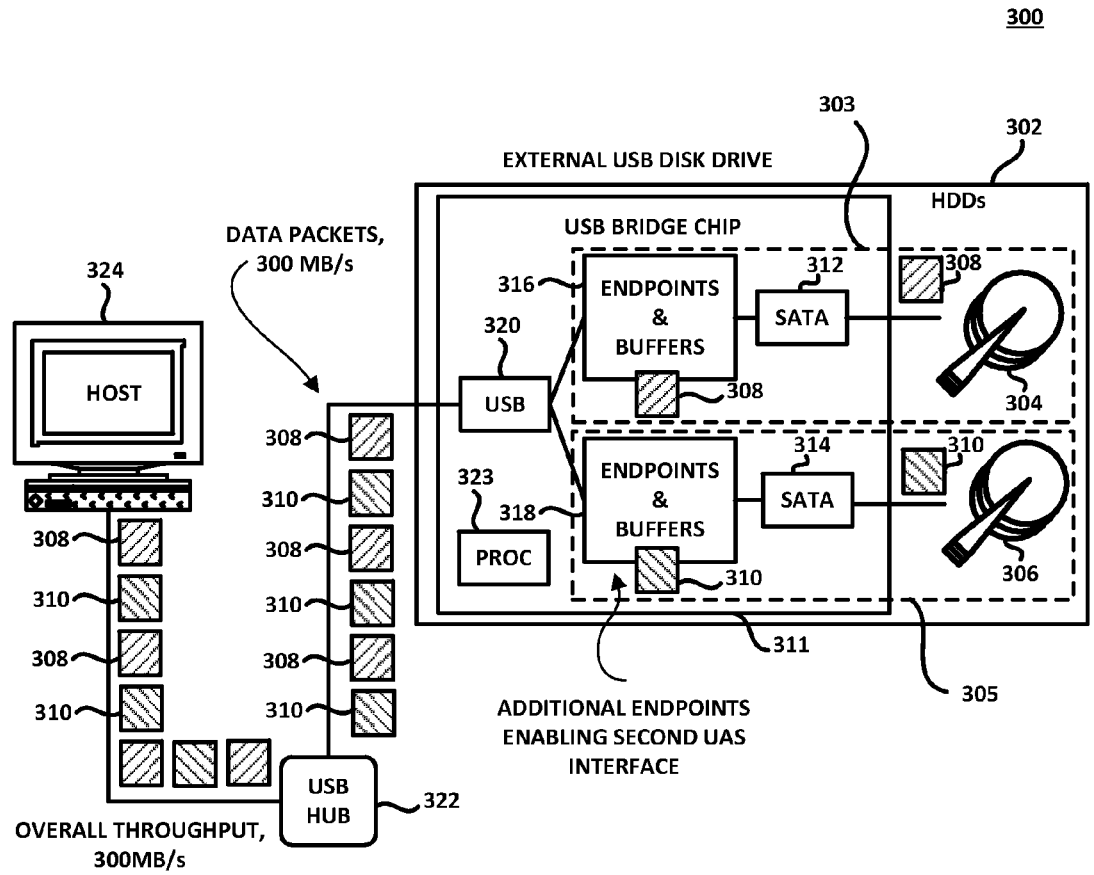
FIG. 3 is a block diagram of a data storage device comprising two disk drives and two independently addressable targets, according to one embodiment.

FIG. 3 is a block diagram of a data storage device 300 comprising two independently host-addressable targets, according to one embodiment. The data storage device 300 may, according to one embodiment, be configured as a Direct Attached Storage (DAS), configured according to the UAS protocol. As shown in FIG. 3, the data storage device 300 may comprise a controller, such as bridge circuitry 311. The bridge circuitry 311 may comprise, according to one embodiment and as shown in FIG. 3 a processor 323, a first host-addressable logical unit 303 and a second host-addressable logical unit 305. Each of the logical units 303, 305 may be configured to be accessed simultaneously and independently of one another by the host 324. The first host-addressable logical unit 303 may comprise a first data storage 304 comprising, for example, a disk drive. The first host-addressable logical unit 303 may also comprise first endpoints and buffers 316 that are associated with the first data storage 304. The second host-addressable logical unit 305 may comprise a second data storage 306 comprising, for example, a disk drive. The second host-addressable logical unit 305 may also comprise second endpoints and buffers 318 associated with the second data storage 306. Each of the host-addressable logical units 303, 305 may comprise a separate device driver associated therewith.

To properly route data sent by the host 324 to the logical units 303, 305, the external disk drive 300 may also comprise a demultiplexer configured to demultiplex data sent by the host into data addressed to the first host-addressable logical unit 303 and data addressed to the second host-addressable logical unit 305. According to one embodiment, the endpoints 316, 318 of the first and second logical units 303, 305 may be addressable with a tuple comprising a device address and an endpoint number as specified in a token packet sent by the host 324 when the host 324 initiates a data transfer session. The host-addressable logical units 303, 305 may be configured as Just A Bunch of Disks (JBOD). Indeed, embodiments may improve the data transfer performance of USB external drives that contain multiple disk drives 304, 306 such as when carrying out simultaneous accesses in JBOD mode; e.g., when a user copies a large amounts of data from one disk drive 304, 306 to the other disk drive 304, 306. Other configurations and organizations are possible. For example, in one embodiment, the disk drives 304, 306 (and others, if present), may be configured as a Redundant Array of Inexpensive Disks (RAID), such as RAID 0 and RAID 1. Embodiments may also be used in conjunction with other protocols, e.g., the older BOT protocol.

A first bus interface 312 may be coupled between the first data storage 304 and the first endpoints 316. According to one embodiment, the first bus interface 312 may comprise, for example, a SATA interface. As shown in FIG. 3 and according to one embodiment, the second host-addressable logical unit 305 may comprise a second data storage 306 comprising, for example, a disk drive. The disk drives 304, 306 may be hybrid disk drives, comprising both rotating media and solid state storage. As in the first host-addressable logical unit 303, the second host-addressable logical unit 305 may comprise second endpoints and buffers 318 that are associated with the second data storage 306. A second bus interface 314 may be coupled between the second data storage 306 and the second endpoints 318.

According to one embodiment, the second bus interface 314 may also comprise, for example, a SATA interface or a Serial Attached SCSI (SAS). The first and second bus interfaces 312, 314 may be configured according to other interface protocols. As shown in FIG. 3, a communication interface 320 may be coupled to the first host-addressable logical unit 303 as well as to the second host-addressable logical unit 305. The communication interface 320 may be configured according to a predetermined communication protocol. For example, the communication interface 320 may be configured according to the USB 3.x (SuperSpeed) standard. The communication interface 320 may be configured according to other standards and communication protocols. The communication interface 320 may, as shown in FIG. 3, be configured to communicate with a host 324 through a hub 322. In the case in which the communication interface 320 is configured according to a USB standard, the hub 322 may comprise a USB hub. The hub 322 may be disposed within the host 324.

As the communication interface 320 is coupled to both the first and second logical units 303, 305, the host may independently issue data access commands to either of the first and second logical units 303, 305 or to both, such that at least a portion of the processing of the data access commands is carried simultaneously on both the first and second logical units 303, 305. In the case in which responding to data access commands requires the first and second logical units 303, 305 to provide data packets to the host, such as would be the case in responding to read commands, data packets from the first logical unit 303, shown at reference numeral 308 and data packets from the second logical unit 305, shown at reference numeral 310, may be provided simultaneously to the communication interface 320 and transmitted to the host 324 through the hub 322 at the same time, such that the, e.g., wired connection between the communication interface and the host through the hub 322 contains data packets 308, 310 originating from both the first logical unit 303 comprising disk drive 304 and from the second logical unit 305 comprising the disk drive 306.

As shown in FIG. 3, one embodiment comprises interleaving the data transfers of multiple data storage devices (e.g., disk drives, hybrid disk drives and/or solid state drives), such as shown at 304, 306, to improve a UAS device's overall performance. As the sum of the transfer rates of the constituent disk drives (in the embodiment shown in FIG. 3) is less than the maximum transfer rate allowed under the (in this case, USB 3.x) standard, the data rate of packets reaching the host 324 is higher than the sustained data rate of either of the first and/or second logical units 303, 305. In an embodiment in which more than two logical units 303, 305, each comprising a disk drive, were provided, the maximum data rate to the host 324 would still be limited to the maximum transfer rate allowed by the communication standard (in this case, USB 3.x), but may still be greater than any one of the constituent disk drives 304, 306. For example, in the implementation of FIG. 3, two disk drives 304, 306 are shown. Supposing that each has a maximum sustained transfer rate of 150 MB/sec, both disk drives 304, 306 may respond to read commands substantially simultaneously and each may put out data packets to the communication interface 320 at their maximum transfer rate of, e.g., 150 MB/sec and the data packets from both storage devices may be transferred to the host 324 at the same time. Assuming that the connection between host 324 and the communication interface is a USB 3.x connection, then data packets 308, 310 from both disk drives 304, 306 may be transferred to the host at a data rate of about 300 MB/sec, which is well under the maximum data rate of USB 3.x of about 400 MB/sec.

According to one embodiment, host-addressable logical unit 303 may be configured provide a first stream of first data packets 308 read from the data storage therein (e.g., disk drive 304) to the communication interface 320 and host-addressable logical unit 305 may likewise be configured to provide a second stream of second data packets 310 read from the data storage therein (e.g., disk drive 306) to the (e.g., same) communication interface 320. The first and second streams may then be combined in the communication interface 320 to generate a combined stream of data packets 308, 310 originating from both disk drives 304, 306 for transfer to the host 324. In greater detail, as shown by the hashing of the representation of the data packets 308 originating from the disk drive 304 and of the data packets 310 originating from disk drive 306, the data packets 308, 310 may be interleaved at the output of the communication interface 320 and on the connection to the host 324.

It is to be noted that the terms "interleaving" and "interleaved" is not intended herein to denote any predetermined ratio of data packets 308, 310. For example, although shown as a 1:1 ratio of data packets 308 to data packets 310, such need not be the case. Indeed, a train of two or more data packets 308 and/or 310 may be interspersed with periods during which the data packets 304, 306 are indeed interleaved in a 1:1 ratio or at some other ratio. According to one embodiment, the external disk drive 302 may provide data packets issued from both 304 and 306 in some serially interleaved fashion, as both logical units 303, 305 are processing and responding to data access commands from the host 324 at the same time or substantially so. The terms "interleaved" and "interleaving" are also intended to encompass any situation in which packets 308, 310 are present at the same time across the connection to the host 324.

For example, according to one embodiment, a high-definition (4K resolution, for example) digital video file may be stripped across disk drives 304, 306. During playback of such a video file, the host will issue read commands to both disk drives 304, 306, which may then be required to respond simultaneously and provide the requested data packets 308, 310 in an interleaved fashion to the host 324, which may then re-assemble and display the high resolution digital video file. Other applications are possible. Indeed, embodiments are applicable to most any situation in which a higher data rate is required or desired than is available from any one data storage device, such as disk drives 304, 306.

Advantageously, one embodiment enables a multi-disk drive USB drive to transfer data as if it were two individual USB drives, thereby achieving the performance of individual USB drives while also retaining the other features afforded by a multi-disk drive product (such as RAID). Accordingly, one embodiment comprises a UAS drive comprising two or more disk drives 304, 306. According to one embodiment, the bridge circuitry 311 may comprise additional structure and functionality, to enable both the first set of endpoints and buffers 316 as well as the a second set of endpoints and buffers 318, which enable the bridge circuitry 311 to function as if it were two independently addressable and independent disk drives. According to one embodiment, the firmware of the bridge circuitry 311 may also be suitable modified to accommodate such structure and functionality.

According to one embodiment, the bridge circuit 311 may be configured to expose two or more (e.g., identical) UAS functions. The operating system of the host 324 may then enumerate both UAS functions and recognize that there are at least two SCSI targets (e.g., disk drives 304, 306) in the drive 300. Although each UAS function can only transfer the data of one command at a time, the bus interface 320 may be configured to interleave data packets 308, 310 from both UAS functions. According to one embodiment, therefore, the overall throughput of the disk drive 300 may be higher than it would otherwise be had the drive 300 had the ability to expose only a single UAS function. Embodiments may also be readily adapted to other data transfer protocols that have limitations similar to USB/UAS. Embodiments, therefore, are not limited to the specific case of USB/UAS and/or its variants.

Figure 4:
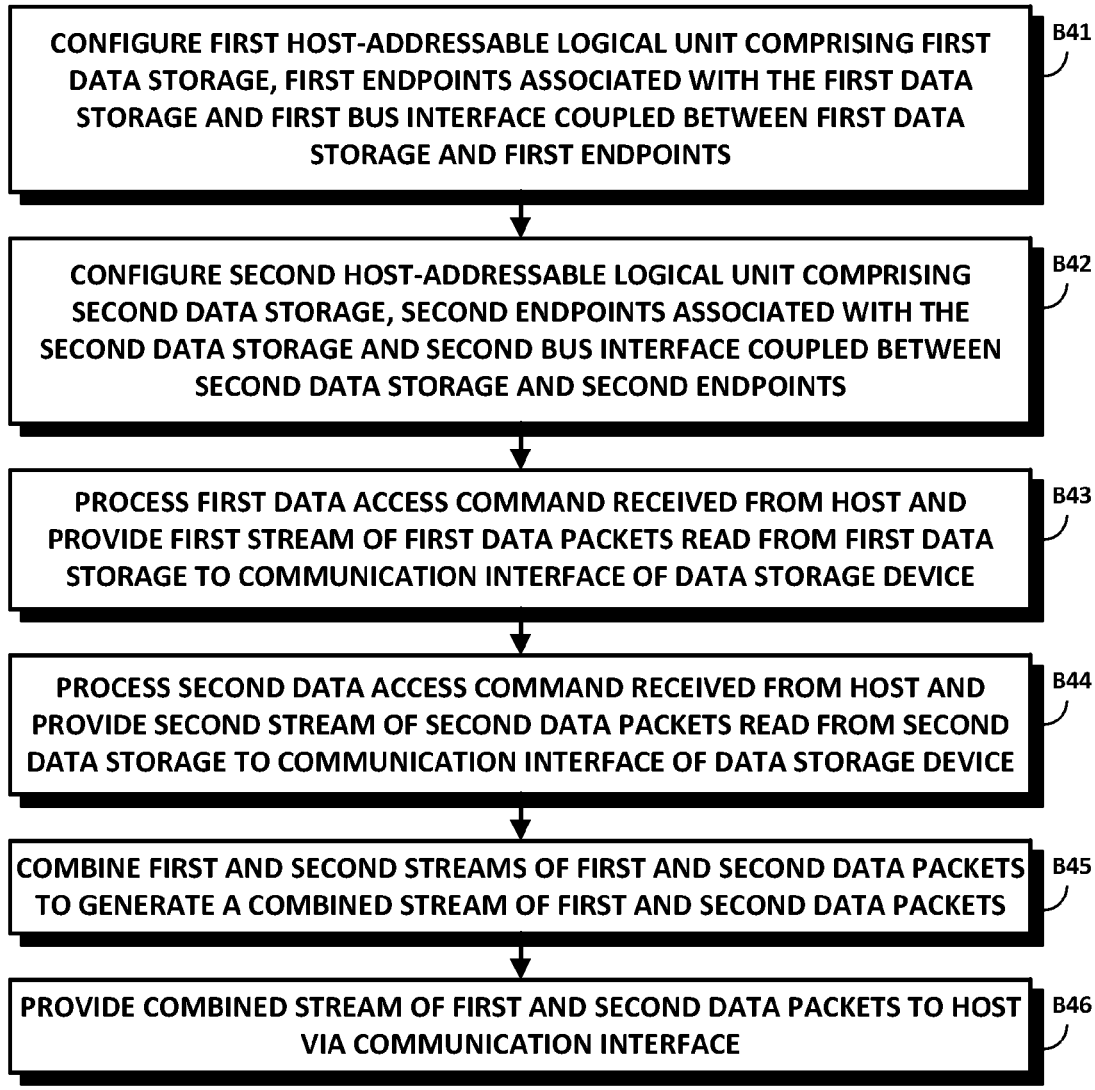
FIG. 4 is a flowchart of a method of providing data packets via a communication interface of a data storage device coupled to a host, according to one embodiment.

FIG. 4 is a flowchart of a method of providing data packets via a communication interface of a data storage device coupled to a host, according to one embodiment. As shown therein, block B41 calls for configuring a first host-addressable logical unit (such as 303) comprising a first data storage (such as disk drive 304, for example), first endpoints (shown at 316) associated with the first data storage and a first bus interface (such as interface 312 in FIG. 3, for example) between the first data storage and the first endpoints. Similarly, block B42 calls for configuring a second host-addressable logical unit (such as 305) comprising a second data storage (such as disk drive 306, for example), second endpoints (shown at 318) associated with the second data storage and a second bus interface (such as interface 314 in FIG. 3, for example) between the second data storage and the second endpoints. As shown at Block B43, a first data access command may then be received from a host (such as shown at 324) and, responsive thereto, the first logical unit may provide a first stream of first data packets read from the first data storage to a communication interface (such as shown at 320) of the data storage device. Likewise, as shown at Block B44, a second data access command may then be received from a host and, responsive thereto, the second logical unit may provide a second stream of second data packets read from the second data storage to the communication interface. The execution of Blocks B43 and B44 may overlap. As shown at Block B45, the first and second streams of first and second data packets may be combined to generate a combined stream of first and second data packets, whereupon the combined stream of first and second data packets may be provided to the host via a communication interface, as shown at B46.

While certain embodiments of the disclosure have been described, these embodiments have been presented by way of example only, and are not intended to limit the scope of the disclosure. Indeed, the novel methods, devices and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual physical and logical structures may differ from those shown in the figures. Depending on the embodiment, certain steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage device, comprising:
a controller;
a first host-addressable logical unit of the data storage device, the first host-addressable logical unit comprising:
   a first data storage;
   first host-addressable endpoints associated with the first data storage; and
   a first bus interface coupled between the first data storage and the first endpoints, wherein the first host-addressable logical unit is configured provide a first stream of first data packets read from the first data storage;
a second host-addressable logical unit of the data storage device, the second host-addressable logical unit comprising:
   a second data storage;
   second host-addressable endpoints, the second host-addressable endpoints being associated with the second data storage and being separate and distinct from the first addressable endpoints; and
   a second bus interface coupled between the second data storage and the second addressable endpoints, wherein the second host-addressable logical unit is configured to provide a second stream of second data packets read from the second data storage; and a communication interface configured according to a predetermined communication protocol, the communication interface being configured to enable the host to simultaneously and independently access the first and second host-addressable logical units, and to combine both the first and second streams to generate a combined stream of data packets for transfer to the host at a combined data rate that is greater than a data rate of the first stream or the second stream.

2. The data storage device of claim 1, further comprising a first device driver associated with the first host-addressable logical unit and a second device driver associated with the second host-addressable logical unit.

3. The data storage device of claim 1, wherein the first and second host-addressable logical units are configured to be accessed independently of one another by the host.

4. The data storage device of claim 1, wherein the first and second host-addressable logical units are configured to be accessed simultaneously by the host.

5. The data storage device of claim 1, wherein the combined stream of data packets comprises first data packets interleaved with second data packets.

6. The data storage device of claim 1, wherein the first and second host-addressable logical units are configured as Just A Bunch of Disks (JBOD).

7. The data storage device of claim 1, further comprising a demultiplexer configured to demultiplex data sent by the host into data addressed to the first host-addressable logical unit and data addressed to the second host-addressable logical unit.

8. The data storage device of claim 1, wherein the first data storage comprises a first hard disk drive (HDD) and wherein the second data storage comprises a second HDD.

9. The data storage device of claim 1, wherein the first and second bus interfaces comprise one of a Serial Attached SCSI (SAS) and a Serial ATA interface.

10. The data storage device of claim 1, wherein the predetermined communication protocol comprises a SuperSpeed Universal Serial Bus protocol.

11. The data storage device of claim 1, configured as an external direct attached storage (DAS) data storage device.

12. The data storage device of claim 1, configured according to the Universal Serial Bus (USB) Attached SCSI (UAS) protocol.

13. A method of providing data packets via a communication interface of a data storage device coupled to a host, the method comprising:
configuring a first host-addressable logical unit of the data storage device, the first host-addressable logical unit comprising:
a first data storage;
first host-addressable endpoints associated with the first data storage; and
a first bus interface coupled between the first data storage and the first host-addressable endpoints;
configuring a second host-addressable logical unit of the data storage device, the second host-addressable logical unit comprising:
a second data storage;
second host-addressable endpoints, the second host-addressable endpoints being associated with the second data storage and being separate and distinct from the first host-addressable endpoints; and
a second bus interface coupled between the second data storage and the second host-addressable endpoints; and processing a first data access command received from the host and providing a first stream of first data packets read from the first data storage to the communication interface; and processing a second data access command received from the host and providing a second stream of second data packets read from the second data storage to the communication interface;

combining the provided first and second streams of first and second data packets to generate a combined stream of first and second data packets; and providing the combined stream of first and second data packets to the host via the communication interface, the communication interface being configured to enable the host to simultaneously and independently access the first and second host-addressable units at a combined data rate that is greater than a data rate of the first stream or the second stream.

14. The method of claim 13, wherein at least a portion of processing the first data access command is carried out at the same time as at least a portion of processing the second data access command.

15. The method of claim 13, wherein the data storage device further comprising a first device driver associated with the first host-addressable logical unit and a second device driver associated with the second host-addressable logical unit and wherein the method further comprises enabling the host to load both the first and the second device driver.

16. The method of claim 13, further comprising enabling the first and second host-addressable logical units to be accessed independently of one another by the host.

17. The method of claim 13, wherein providing the combined stream of first and second data packets comprises interleaving the first data packets with the second data packets.

18. The method of claim 13, further comprising configuring the first and second host-addressable logical units as Just A Bunch of Disks (JBOD).

19. The method of claim 13, further demultiplexing data sent by the host into data addressed to the first host-addressable logical unit and data addressed to the second host-addressable logical unit.

20. The method of claim 13, wherein the first data storage comprises a first hard disk drive (HDD) and wherein the second data storage comprises a second HDD.

21. The method of claim 13, wherein the first and second bus interfaces comprise one of a Serial Attached SCSI (SAS) and a Serial ATA interface.

22. The method of claim 13, wherein the communication interface comprises a SuperSpeed Universal Serial Bus interface.

23. The method of claim 13, further comprising configuring the data storage device as an external direct attached storage (DAS) data storage device.

24. The method of claim 13, further comprising configuring the data storage device as a Universal Serial Bus (USB) Attached SCSI (UAS)-compliant data storage device.

* * * * *